Oct. 11, 1960

L. R. BUCKNER, JR 2,956,010

METHOD AND APPARATUS FOR THE SUPPLY OF FLUID REACTANTS
TO COMPACT BEDS OF GRANULAR CONTACT MATERIAL

Filed June 5, 1958

INVENTOR
Lowell R. Buckner, Jr.
BY
Andrew L. Gabriault
ATTORNEY

Oct. 11, 1960 L. R. BUCKNER, JR 2,956,010
METHOD AND APPARATUS FOR THE SUPPLY OF FLUID REACTANTS
TO COMPACT BEDS OF GRANULAR CONTACT MATERIAL
Filed June 5, 1958 4 Sheets-Sheet 2

INVENTOR
Lowell R. Buckner, Jr.
BY
Andrew L. Gabriault
ATTORNEY

United States Patent Office

2,956,010
Patented Oct. 11, 1960

2,956,010

METHOD AND APPARATUS FOR THE SUPPLY OF FLUID REACTANTS TO COMPACT BEDS OF GRANULAR CONTACT MATERIAL

Lowell R. Buckner, Jr., Wenonah, N.J., assignor to Socony Mobil Oil Company, Inc., a corporation of New York Filed June 5, 1958, Ser. No. 740,070

7 Claims. (Cl. 208—166)

This invention relates to a method and apparatus for the conversion of fluid reactants in the presence of a moving mass of granular contact material. It is particularly concerned with a method and apparatus for the supply of reactant and contact material to the moving mass.

Typical of the processes to which this invention applies is the catalytic conversion of high boiling liquid or mixed phase hydrocarbons to lower boiling hydrocarbons by contacting the hydrocarbon charge with a moving mass of granular absorbent contact material. After use in the conversion zone the contact material is passed to a regeneration zone in which carbonaceous contaminants, deposited thereon by the conversion, are burned off so that the contact material may be reused in the conversion zone. Other processes with which the invention will find application include catalytic dehydrogenation, polymerization, isomerization, alkylation and the like of fluid hydrocarbon using an adsorbent catalytic solid and the thermal coking, cracking and the like of fluid hydrocarbons in the presence of a granular inert material.

Contact materials suitable for use in such processes are well-known in the art. Catalytic solids include natural and treated clays and synthetic associations of silica, alumina and magnesia and combinations thereof. Contact material of an inert character frequently takes the form of refractory materials or stones or particles of coke. For use in the operation of this invention the contact material should be of palpable particulate form as distinguished from finely divided powders. It may take the shape of pellets, tablets, spheres and the like, or particles of irregular shape, such as are obtained from grinding and screening operations. Generally, the contact material should be within the size range about 1 inch to 100 mesh, and preferably 4 to 20 mesh by Tyler Standard Screen Analysis. The term "granular" is used herein to refer to contact material of this size range, whether regular or irregular in shape.

Among the most pressing problems in this field have been those surrounding the development of techniques for supplying the reactant and contact material to the compact reaction bed. When the reactant must be supplied at a substantially different temperature than the contact material, as is the case in catalytic cracking of hydrocarbons, it becomes important that the manner of supply is such that large temperature differentials across the reaction bed are not created by the technique of supply. United States Patent No. 2,846,370, addresses itself to this problem and indicates that the solution is to supply the reactant as a plurality of closely spaced streams. Frequently, however, it is uneconomical to supply the reactant at as many different injection points as the invention there requires. Attempts have therefore been made to develop a system using fewer total injection points but achieving the same desirable result. Some of the systems developed have taken the form of injecting the reactant into a narrow stream carrying a substantial portion of the contact material flowing to the bed and then distributing this contact material across the bed in some particular way. Such a system is that described and claimed in United States patent application Serial Number 536,974, filed September 27, 1955.

In the contact material reaction bed, when the reactant is supplied to a narrow stream of contact material which supplies the bed, temperature differentials may be set up in two directions. In the first of these the temperature differential extends horizontally and circumferentially around the reaction bed. This temperature differential may be controlled, as explained in Serial Number 536,974, by a suitable spacing of the injection points. The other type of differential is set up radially. The prior art discloses no technique by which this temperature differential may be eliminated. The instant invention includes such a technique.

Another problem peculiar to the moving mass system is to provide a reactant introduction scheme which adds as little as possible to the pressure drop across the reaction system. It is no longer always desirable merely to pass hydrocarbon reactant into the upper end of the contact reaction bed. This is particularly true when a part of the reactant is in the liquid phase, since the hydrocarbon liquid must be carefully kept away from exposed hot metal portions of the reactor. On hot metal the liquid hydrocarbon might readily be converted and build up coke accumulations which later may break off and plug up restricted passages in the circulating system.

It has, therefore, been found desirable to inject the hydrocarbon reactant into a compact mass of contact material which acts to keep any liquid away from the hot metal parts and to scrub such metal parts as the liquid does contact free of accumulated coke before a substantial build-up occurs. A suitable system which achieves this is claimed in Serial Number 536,974, filed September 27, 1955. As a part of the instant invention, it has been discovered that when reactants are injected into a confined stream, the pressure drop imposed by the feed system itself may be minimized in a particular manner.

A major object of this invention is to provide a method and apparatus for the supply of fluid reactant to a moving mass of granular contact material.

Another object of this invention is to provide a method and apparatus for the supply of a fluid hydrocarbon charge to a cylindrical compact reaction bed, which method and apparatus avoids setting up radial temperature differentials across the bed.

Another object of this invention is to provide a method and apparatus for supplying fluid reactant to a compact reaction bed of granular contact material, which method and apparatus provides for a minimum increase in pressure differential upon the reaction system.

These and other objects of the invention will be apparent from the following discussion of the invention.

In one broad aspect, this invention supplies contact material to the upper end of the reaction bed as a confined annular stream. Within this stream are situated a plurality of reactant injection areas which are suitably spaced apart to avoid circumferential temperature differentials. In addition, these areas are rectangular in shape and extend completely across the annular stream, thereby eliminating radial temperature differentials.

In another broad aspect, this invention provides for injection of reactant at a plurality of points in an annular stream feeding a reaction bed, which annular stream has an internal diameter, in relation to the height of the injection points above the lower end of the annular stream, that provides for minimum pressure differential being imposed on the system by the feeding mechanism. This aspect of the invention applies whether the injection points are rectangular in shape or not.

This invention will be best understood by referring to the attached drawings, of which Figure 1 is an elevational view, partially in section, of a hydrocarbon conversion vessel employing one form of this invention;

All of these drawings are diagrammatic in form and like parts in all bear like numerals.

This invention will be illustrated in connection with a single process, the moving bed catalytic conversion (Thermofor catalytic cracking) of a hydrocarbon charge supplied as a mixture of liquid and vapor. It will, of course, be immediately obvious that it applies likewise to many other processes and the discussion of this particular one is for illustrative purposes only.

Figure 1:
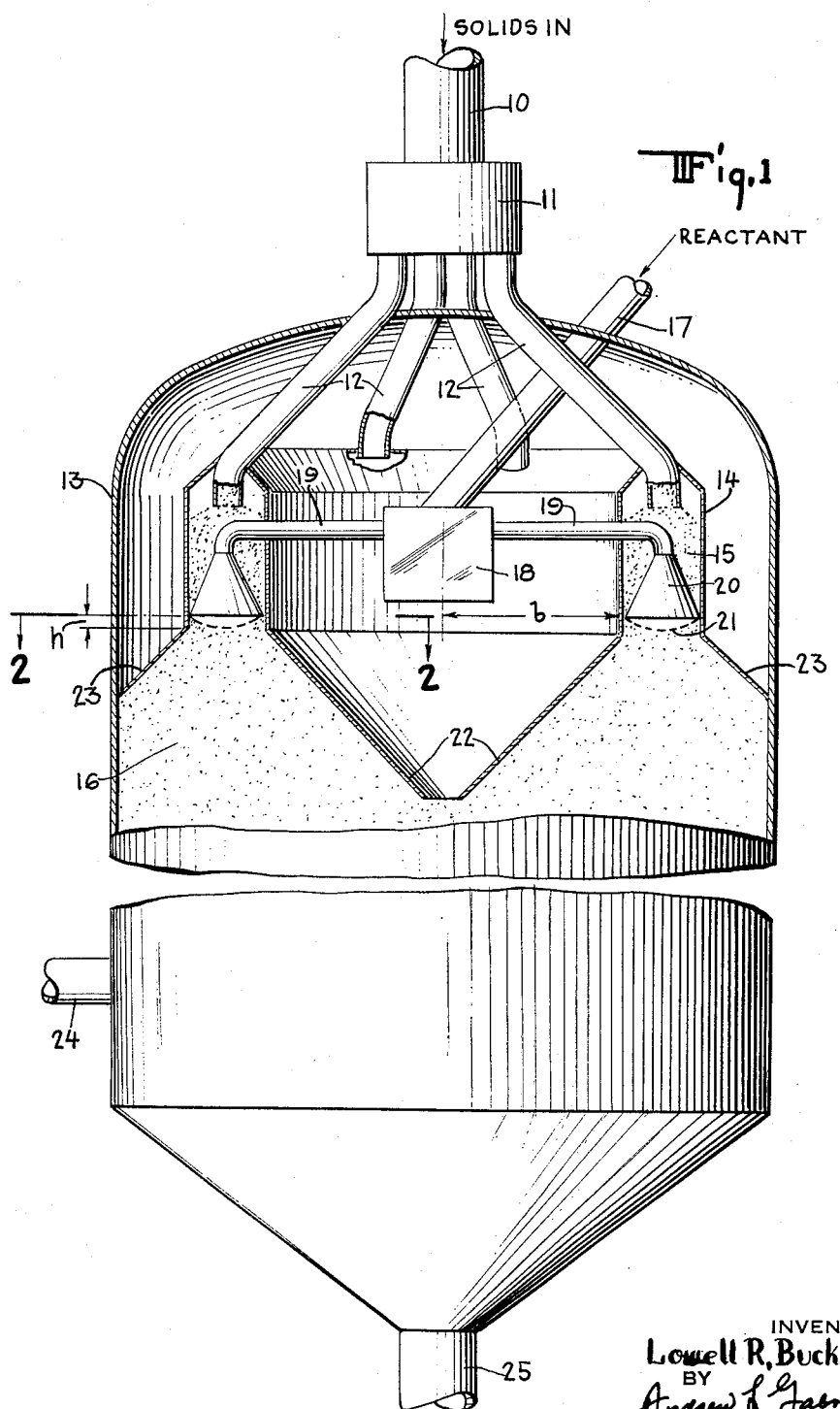

Turning to Figure 1, a fresh hot catalytic contact material which may be, for example, a synthetic silica-alumina catalyst, is passed from the regeneration zone (not shown) into passageway 10. This catalyst may be, for example, at a temperature of 1030° F. This single stream of catalyst is subdivided into a plurality of small streams by flow splitting device 11 which may, for example, take the form described and claimed in United States Patent 2,745,795. The plurality of streams so formed pass through passageways 12 into the upper end of reaction vessel 13. The granular catalyst is discharged from passages 12 in the upper end of an annular passageway or hood 14. Annular-shaped passageway 14 has the same center line as cylindrical reaction chamber 13. Within passageway 14 the granular solids form a compact stream 15 which gravitates into the upper end of reaction bed 16.

As used herein, the terms "annular," "annular-shaped," and the like, refer to a stream or member which is of the shape of the space defined between two members of the same or different shape, but of different lateral dimensions, placed symmetrically one within the other, regardless of whether or not such space is ring-shaped.

A hydrocarbon reactant, which may be at a temperature of 800° F., enters reaction vessel 13 through conduit 17 and passes into a manifold 18. Manifold 18 acts to split the reactant into a plurality of equal streams which flow outwardly to passages 19. These streams feed reactant distributing passageways 20 which, at least on their lower ends, are substantially rectangular in shape and expand completely across annular passageway 14 in the radial direction.

It is realized that these areas are not true rectangles, since their outer and inner edges abut the curved segments of the annular passageway. Also, in very preferred forms, the other two sides are not absolutely parallel but take the direction of the expanding contact material and are perpendicular on both ends to the curved segments forming the other two sides. The term "rectangular" is used herein broadly to include areas employing both of these features. The one requirement is that the area extend completely across the annular passageway in the direction of contact material expansion.

The lower ends of passageways 20 are spaced apart horizontally in the critical manner defined below and their lower ends are preferably located within annular passageway 14 in the manner defined below.

The reactant may simply enter the exposed contact material surfaces below each of passageways 20, or it may be supplied at sufficient velocity to disrupt those surfaces and form a vapor bubble in which reactant and contact material are mixed. To do this the velocity of reactant injection must be above the boiling mass velocity.

The "boiling mass velocity" is used herein to denote a mass velocity (unit weight per unit area unit time) of hydrocarbon charge which will cause a pressure gradient (unit pressure per unit length) in the immediate vicinity of the injection area equal to the apparent density of the contact material. "Apparent density" here refers not to the actual density of the contact material but to a density determined by weighing a given volume of contact material particles which exists packed to the degree it would be packed at the injection area. Thus, if the apparent density of the contact material were 43 pounds per cubic foot, the boiling mass velocity would be the mass velocity which gives a pressure gradient equal to 43 pounds per square foot per foot of length.

The upper end of reaction bed 16 is confined at an angle with the horizontal greater than the angle of repose of the contact material by gas impervious solid surfaces 22 and 23. The angle of repose varies with each particular contact material, but it is generally within the range 25–45 degrees. Most commercially used contact materials have an angle of repose of about 30 degrees. With these contact materials it is preferred that the confining members 22 and 23 make an angle with the horizontal within the range 35 to 40 degrees. The contact material from stream 15 expands beneath solid surfaces 22 and 23 to supply the entire cross-section of reaction bed 16. Likewise, the vapor hydrocarbon will expand outwardly beneath the surfaces. The hydrocarbon reactants flow downwardly through bed 16 and are converted to the desired products which are withdrawn through conduit 24. A suitable product collection system of the type well-known in the art is preferably associated with conduit 24. The granular contact material, bearing a carbonaceous deposit, is removed through conduit 25. This removal, of course, is continuous, thereby providing that all catalyst in the system is moving at all times.

Figure 3:
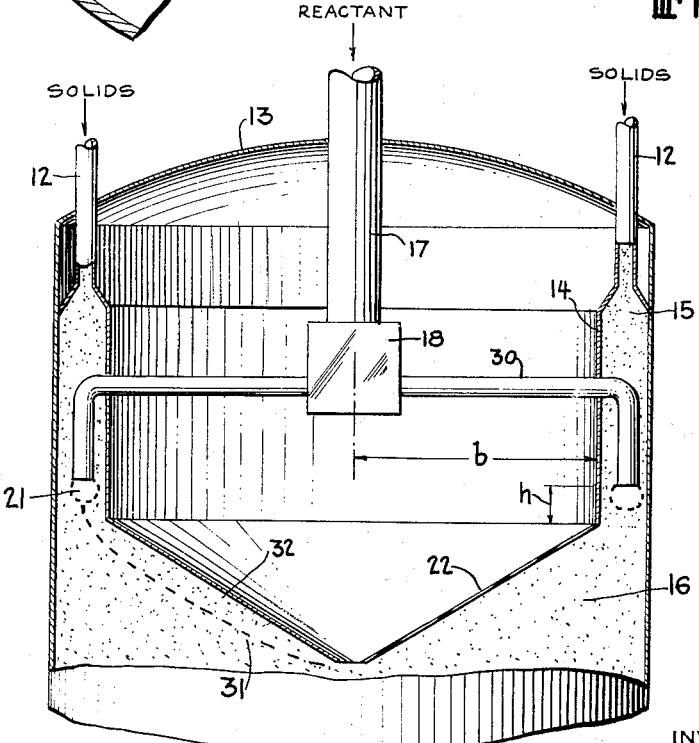
Figure 3 is an elevational view, partially in section, of the upper end of a hydrocarbon conversion reactor employing a less preferred form of this invention.

Figure 3 illustrates a less preferred form of this invention. It does not employ the rectangular shaped inlets on the ends of its reactant injection passages. Thus, it does not act to eliminate radial temperature differentials. However, the height ($h$) of the injection pipes is fixed in the critical manner described below.

As indicated above, an important feature of this invention involves prevention of radial temperature gradients across the reaction bed. When a reactant is injected into hotter contact material by conventional round pipes, such as shown in Figure 3, both radial temperature gradients (those along the radius of the reaction bed) and circumferential gradients are set up. The mechanism by which such gradients are formed is explained in considerable detail in United States Patent 2,846,370 to Halik et al. Briefly, whenever reactant at one temperature flows across contact material at another temperature and flowing in a different direction, a temperature gradient will be set up.

Referring again to Figure 3, contact material to supply the reaction bed expands outwardly in a narrow layer 32, the underside of which flows along a distinct surface like that indicated by line 31. Above this surface the contact material is flowing laterally and downwardly while below it, in the main body of the bed, the contact material particles descend substantially vertically. Particles are continuously dropping from the underside of this layer 32 into the main body of the bed. Cool vapor, which expands laterally through the vertically descending contact material, cools the particles immediately adjacent the bubble 21 the most. As it moves laterally it is heated by the contact material it has cooled. Thus, the descending particles furthest removed from the bubbles 21 are cooled the least. As these particles start to move laterally in the layer 32, the coolest particles by their location wind up on the bottom of th layer and the hottest particles on top. Thus, the coolest particles drop out of layer 32 first, then the next coolest and so on. The result is that there are cold spots in the bed immediately below bubbles 21 and hot spots at the points of furthest expansion of the contact material.

Figure 2:
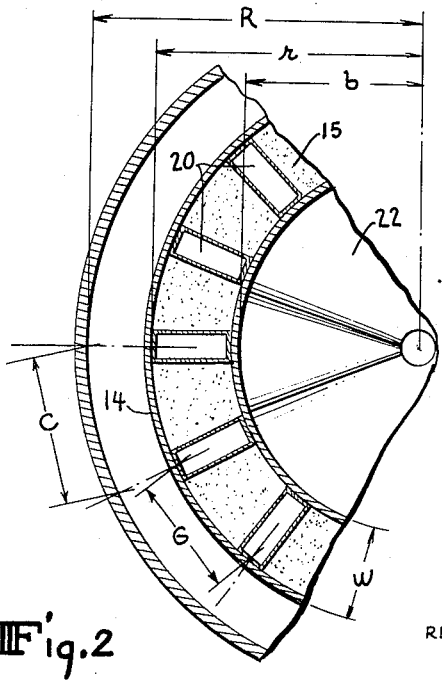
Figure 2 is a partial sectional view taken along lines 2—2 of Figure 1.

The foregoing temperature pattern is radial, e.g., along the radius of reaction bed 16. From examining Figure 2 it will be apparent that by the same mechanism circumferential temperature patterns are set up, with cold spots beneath the bubbles and hot spots at the furthest circumferential contact material expansion points.

Figure 4:
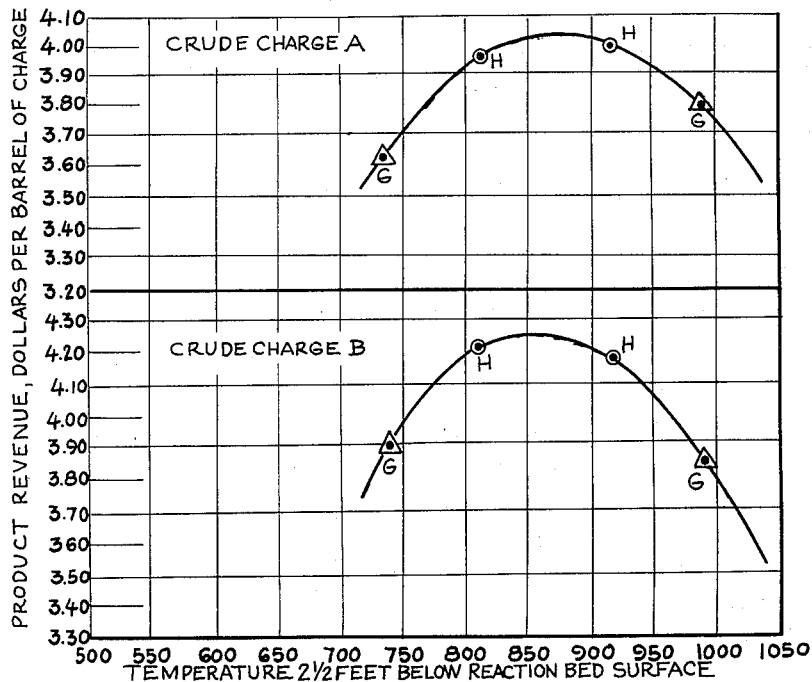
Figure 4 is a graph illustrating the effect on product revenue from a catalytic cracking unit of temperature differentials across the reaction bed.

The importance of these temperature differentials is illustrated by Figure 4. It is well-known that for each conversion, such as catalytic cracking, there is a single optimum conversion temperature at which the conversion should be conducted. The temperatures of reactants and contact material entering the reactor are normally adjusted to approach closely this optimum if perfect uniform heat transfer between the two were achieved. When temperature differentials, due to imperfect contact, are set up and persist throughout the reaction bed, obviously substantial quantities of the reactant must be converted at temperatures removed from that of the optimum. Considering Figure 5, the value of product is plotted against conversion temperature for two different charge stocks. It is seen that there is a rapid falling off in product value on both sides of the optimum. With temperature differentials conversions will occur all around these curves between the maximum and minimum temperatures. Thus, if the temperature differential is wide, conversions might occur all around the curves between points G—G on the curves of Figure 4, while if they are narrow, conversion might occur only between points H—H, obviously giving a much higher total product value.

Figure 5:
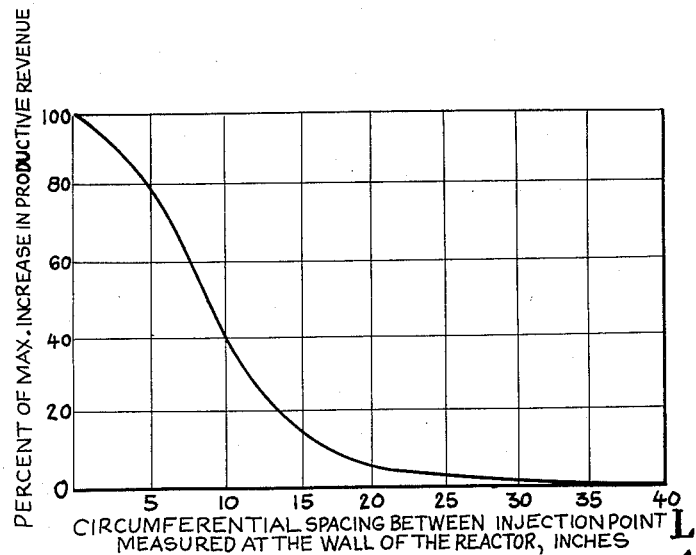
Figure 5 is a graph illustrating the criticality of the circumferential spacing between injection points.

Circumferential temperature differentials may be eliminated by proper spacing of the reactant inlets. When the inlet areas are close enough together, much of the temperature difference initially formed eliminates itself shortly below the bed surface. This is demonstrated in Figure 5, which plots as the abscissa the distance between lines drawn through adjacent reactant inlet areas measured at their intersection with the vertical plane of the edge of the reaction bed (this is the limit of the expansion of the contact material and therefore the place where hot and cold contact material are separated most). This distance is designated C in Figure 2. The ordinate in Figure 5 is the increased value of product measured as a percentage of the maximum increase in value of product possible over the product obtained with a 40 inch spacing. It is apparent that there is no improvement in the temperature pattern until the critical spacing of 20 inches is reached. Closer spacing than this leads large increases in product revenue. Therefore, to minimize the circumferential temperature differentials, the spacing measured in the foregoing manner should be less than 20 inches, preferably less than 10 inches, and still more preferably less than 7 inches.

This may be expressed in another way when the reaction bed is cylindrical and it is fed by a ring-shaped annular stream with the same vertical axis of symmetry as the reaction bed. In this situation the actual spacing between the outer edges of the reactant inlet areas (distance G in Figure 2) should be less than $$\frac{20r}{R}$$

inches, preferably less than $$\frac{10r}{R}$$

inches, and still more preferably $$\frac{7r}{R}$$

inches, where r is the outside radius of the injection points and R is the radius of the reaction bed. It is emphasized that these formulae give the actual distance between the outer centers or edges of the reactant inlet areas, designated as G in Figure 2, and not the previously mentioned distance between lines through the centers of the areas measured at the reaction bed edge, designated C in Figure 2. Where the rectangular inlets are used, r should be measured to the outside edge of the annular stream.

When using circular pipes completely surrounded by contact material, such as shown in Figure 3, not only circumferential but radial temperature patterns are set up because cross-flow of hot contact material and cooler reactants occurs in all directions. The radial temperature differentials are not controlled at all by the circumferential spacing. However, as previously mentioned, by use of the rectangular inlets of this invention, the radial temperature differentials are substantially eliminated. This is because when they are used there is no contact material in the annular stream radially in front or in back of the reactant inlet area. Therefore, no heat transfer occurs there. Thus, when using the rectangular inlets, the temperature along any given radius is substantially uniform so that proper circumferential spacing of the inlets may yield complete elimination of temperature gradients.

To achieve the foregoing, the inlet areas must extend radially completely through the annular stream 15. The other two sides of the inlets should preferably take the direction of the expanding contact material which results in their diverging slightly; but unless the width of the annular stream is very great they may be parallel, with substantially the same result. If desired, more than one level of inlets may be used within the annular stream.

While this invention has been described in connection with cylindrical reaction beds and will find primary application with these, it may also be applied to beds of other shapes, such as rectangular, with the same desirable results.

As previously indicated, this invention applies whether the charge is liquid or vapor or a mixture of both.

When an expanded section is used on the lower end of reactant inlet 19 (Figure 1) it may be desirable to provide vanes or a plate with orifices within the expanded section to achieve uniform flow out of the lower end of the expanded rectangular member.

Figure 6:
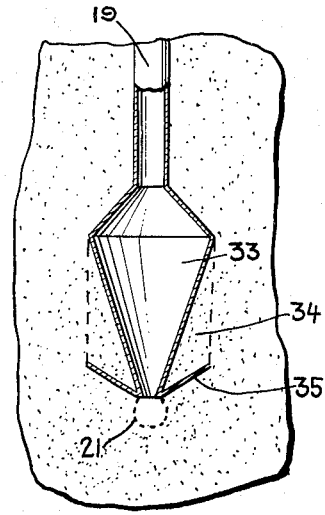
Figure 6 is a cross-sectional view through one of the rectangular ducts that may be used in this invention.

Within the reactant distribution system, particularly those parts embedded in the flowing contact material, the velocity of hydrocarbon charge should be above 10 feet per second, and preferably above 50 feet per second to avoid excessive coking in the system.

Where a vapor bubble 21 is utilized at the reactant inlet it may be desirable, in order to insure a uniform bubble along the length of the lower end of the rectangular inlet duct, that the lower end of the duct be constricted. Such a construction is shown in Figure 6, which is a vertical cross-sectional view through one of the ducts. It is seen that duct 33 has a lower end of reduced cross-section which forms the rectangular inlet area across the annular passageway. In addition, duct 33 is equipped on its lower end with baffles 35 extending laterally away from the outer sides of duct 33. These baffles support a relatively stagnant layer of contact material 34, which serves to insulate the hydrocarbon reactant flowing through duct 33 from heat transfer with the flowing hot contact material, thereby reducing the tendency toward coke formation within duct 33.

It is to be noted that in this invention the upper surface of the reaction bed is confined. This is mainly to prevent vapor bypassing the bed before it and the contact material have arrived at the same temperature. Therefore, it is only necessary that the bed be confined a distance beyond the annular stream for complete heat transfer between vapor and contact material to take place. After it has taken place the bed need not be confined, and in fact probably should not be so confined for ease of purging during reactor shutdowns.

In selecting and utilizing a reactant feed system, an important factor is the additional pressure drop requirement that the system imposes on the over-all operation. Obviously, a higher pressure drop requirement will add to the power consumed in forcing the reactant through the system and, in processes like moving fed catalytic cracking, will require a higher structure for the cracking unit because of the need for a longer seal leg to feed catalyst into the reactor.

In studying the application of this invention to a moving mass catalytic conversion system of a capacity of 15,000 barrels per day of high boiling petroleum hydrocarbons and employing a cylindrical reactor of 16 feet in diameter, certain relationships critical to the minimization of pressure drop in the reactant feed system were noted. The system studied employed a catalyst circulation of 360 tons per hour and baffles 22 and 23 made angles of 35 degrees with the horizontal.

Figure 7:
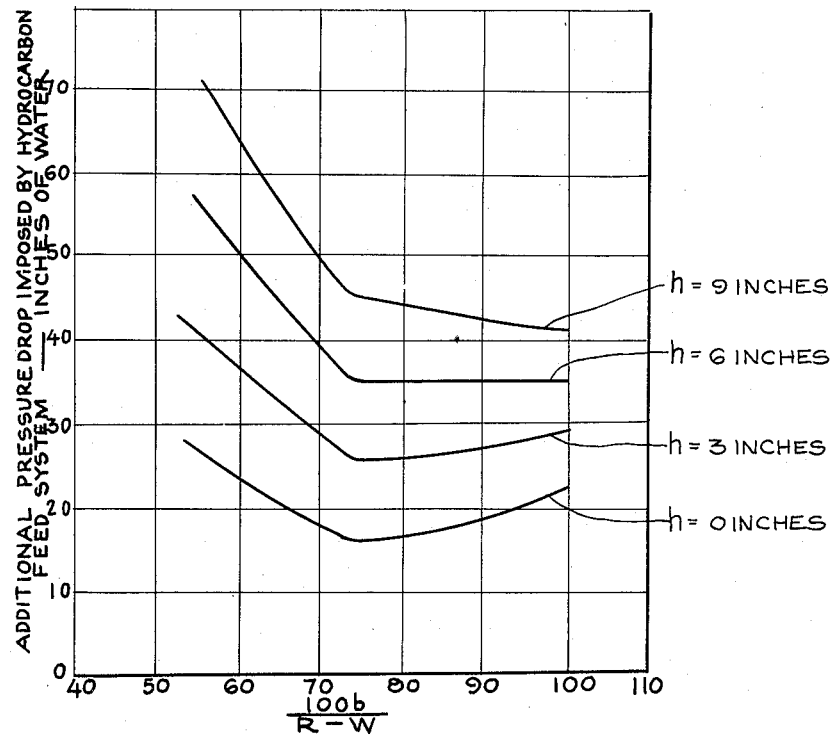
Figure 7 is a graph illustrating various relationships between the dimensions of a reactant injection system which are critical for minimum pressure drop.

These critical relationships are illustrated by Figure 7, which plots the additional pressure drop imposed by the feed system against a quantity $$\frac{100b}{R-W}$$

In this expression $b$ is the inside radius of the annular passageway or stream 14, R is the inside radius of the reactor 13 or the outside radius of reaction bed 16, and W is the radial width of the annular passageway 14 or stream 15. All of these quantities should be expressed in consistent linear units. It will be readily apparent that the foregoing quantity, $$\frac{100b}{R-W}$$

is the actual inside radius of the annular stream expressed as a percentage of the maximum possible inside radius of that stream, this last being the inside radius when the stream flows down the reactor wall.

It will be noted that there are a number of curves on Figure 7, each for a different level, $h$, of injection of reactant into the annular stream. The injection level, $h$, is measured in inches from the lower end of the annular passageway 14 to the reactant inlet 20 or 30. For ease of understanding, $b$, $h$, R and W are illustrated on Figures 1 and 2.

Data like that plotted in Figure 7 will be useful in designing units with annular solids inlets to determine the optimum location of the inlet. It is, of course, immediately apparent from Figure 7 that the lower the reactant injection level in the annular solids stream, the lower will be the pressure drop requirement of the reactant feed system. However, it will often not be desirable to place the reactant inlet above the bottom of the annular stream. For example, more uniform temperatures throughout the reaction bed will be obtained if the reactant inlet is up in the annular passageway.

Figure 7 illustrates certain relationships critical to the design of this type of system. It will be seen that where the reactant inlet is less than 6 inches above the lower end of the annular solids stream, there is a critical minimum of $$\frac{100b}{R-W}$$

for the minimum pressure drop addition. In Figure 4 this minimum is when $$\frac{100b}{R-W}=74$$

or when $b=0.74(R-W)$.

It is also to be noted that when the reactant inlet is positioned 6 inches or more above the lower end of the annular stream, minimum pressure drop will be obtained when $$\frac{100b}{R-W}=100$$

or, what is the same thing, when the annular stream runs down the reactor wall.

Figure 8:
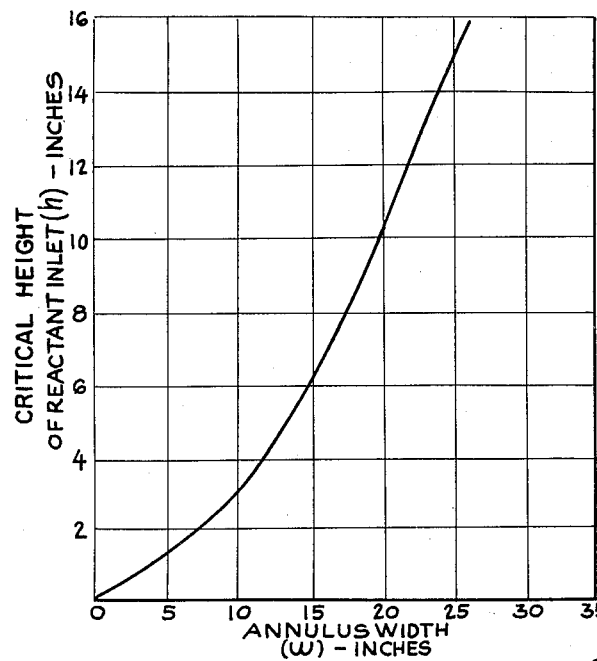
Figure 8 is a graph further particularizing a factor critical for minimum pressure drop in this invention.

Figure 7 was determined assuming an annulus width of 15 inches. Curves similar to Figure 7 have been developed assuming other annulus widths. These curves in general resemble those of Figure 7, except that the inlet height above which it is desirable that the annulus inside radius be at its maximum and the annular stream flows down the wall of the reactor is different for different annulus widths. This height above which it is necessary that the annulus flow down the reactor wall but below which it is necessary that the annulus be placed at some location away from the wall for minimum pressure drop addition is termed the "critical height" or "critical $h$" herein. Figure 8 is a plot of this critical height against annulus width.

The curves like Figure 7 for other annulus widths showed minimum pressure drop values for $$\frac{100b}{R-W}$$

below the critical heights. These other minimum values were not identical with that of Figure 7 but were sufficiently close that it can be stated that for minimum pressure drop addition below the critical height $$\frac{100b}{R-W}$$

should be within the range of 70 to 90. Stated another way, $b$ should be greater than $0.70(R-W)$ but less than $0.90(R-W)$ all in consistent units. This range includes not only the minimum points on the curves like Figure 7 but a reasonable range in each side thereof. Preferably, $b$ should be greater than $0.72(R-W)$ but less than $0.80(R-W)$.

Of course, the critical height can be routinely determined for any system. For most systems, however, it will be satisfactory to use Figure 8. Once the annular stream width, the reactant inlet height, and reactor size have been selected, the reactant inlet height may be plotted against the annulus width on Figure 8. If the point so plotted lies above the curve on Figure 8, the annular stream should be made to flow down the wall. If this point is below the curve, the annular stream should have a radius greater than $0.70(R-W)$ but less than $0.90(R-W)$.

The foregoing relationships, as indicated, were developed by considering a hydrocarbon catalytic conversion system of a particular physical configuration and charge rate. It is believed that the relationships developed have a broad application, however, to other similar systems, particularly where the sizes of the various parts of the system and the charge rates are in similar proportions to those in the system considered.

The foregoing critical relationships are preferably applied with the previously described rectangular inlets. However, these relationships apply when the rectangular inlets are not used, as in the device of Figure 3.

Example

To further demonstrate this invention, there follow design and operational data on one Thermofor catalytic cracking unit employing this invention. The unit design approximated Figure 1 herein.

| | |
|---|---|
| Catalyst circulation rate _____tons/hour__ | 360 |
| Catalyst inlet temperature _____° F__ | 1050 |
| Hydrocarbon reactant feed rate ___barrels/day__ | 15,000 |
| Hydrocarbon reactant feed temperature ___° F__ | 800 |
| Reactor radius _____feet__ | 8 |
| Annular stream inside radius _____do____ | 5 |
| Annular stream width_____inches__ | 15 |
| Height of lower end of reactant inlet passages above lower end of annular passage __inches__ | 3 |
| Number of reactant inlets _____ | 100 |
| Spacing of line through centers of adjacent reactor inlet areas measured at reactor wall __inches__ | 6 |
| Maximum temperature difference at bottom of reaction _____° F__ | 23 |

It is intended to cover herein all changes and modifications to the examples of the invention, chosen for purposes of disclosure, which do not constitute departures from the spirit and scope of the invention.

I claim:

1. In a process for the conversion of fluid reactants in the presence of a moving bed of granular contact material, the improved method of supplying hydrocarbons and contact material to the bed, which comprises: gravitating fresh contact material to the upper end of the bed as a laterally confined ring-shaped annular stream of substantially less horizontal cross-sectional area than the upper surface of said bed, the inside radius of said annular stream being greater than $0.70(R-W)$ but less than $0.90(R-W)$, where $R$=radius of the moving bed and $W$=the width of the annular stream; expanding the contact material discharged from said stream outwardly across the upper end of said bed and confining the portion of the upper end of said bed adjacent the lower end of the annular stream with gas impervious solid surfaces at angles with the horizontal greater than the angle of repose of the contact material; injecting a fluid reactant into said annular stream at a plurality of horizontally spaced points, each of which is less than the critical height above the lower end of said stream.

2. The process of claim 1 further limited to the reactants being hydrocarbons and the areas of injection of hydrocarbons extending radially completely across said stream, the internal diameter of the annular stream being less than $0.80(R-W)$ but greater than $0.72(R-W)$ and the distance between adjacent areas of hydrocarbon injection being less than $$\frac{10r}{R}$$

inches, where $R$=the radius of the moving bed and $r$=the outside radius of the annular stream.

3. An apparatus for supplying granular contact material and hydrocarbons at different temperatures to a cylindrical conversion chamber, which comprises in combination: members defining a ring-shaped annular passageway extending into the upper section of said conversion chamber, the internal radius of said annular passageway being less than $0.90(R-W)$ and greater than $0.70(R-W)$, where $R$=the radius of said conversion chamber at the level of the lower end of said annular passageway and $W$=the radial width of said annular passageway; means for supplying contact material to the upper end of said passageway; a plurality of rectangular passageways extending radially completely across said annular passageway with lower ends less than the critical height above the lower end of said annular passageway and the distance between the center lines of adjacent rectangular inlets being less than $$\frac{10r}{R}$$

inches, where $R$=the radius of said conversion chamber and $r$=the largest radius of said annular passageway and means for supplying hydrocarbon charge to the upper ends of said radial passageways.

4. An apparatus for supplying granular contact material and hydrocarbons at different temperatures to a cylindrical conversion chamber, which comprises in combination: members defining a ring-shaped annular passageway extending into the upper section of said conversion chamber, the internal radius of said annular passageway being less than $0.80(R-W)$ and greater than $0.72(R-W)$, where $R$=the radius of said conversion chamber at the level of the lower end of said annular passageway and $W$=the radial width of said annular passageway; means for supplying contact material to the upper end of said passageway; a plurality of rectangular passageways extending radially completely across said annular passageway with lower ends less than the critical height above the lower end of said annular passageway and the distance between the center lines of adjacent rectangular inlets being less than $$\frac{20r}{R}$$

inches, where $R$=the radius of said conversion chamber and $r$=the largest radius of said annular passageway and means for supplying hydrocarbon charge to the upper ends of said radial passageways.

5. An apparatus for supplying granular contact material and hydrocarbons at different temperatures to a cylindrical conversion chamber, which comprises in combination: members defining a ring-shaped annular passageway extending into the upper section of said conversion chamber and terminating therein with the outer edge of the discharge end of said passageway tangent to the inside wall of said conversion chamber; means for supplying contact material to the upper end of said passageway; a plurality of hydrocarbon inlets terminating on rectangular lower ends which extend radially completely across said annular passageway at a plurality of horizontally spaced points therein which are less than 10 inches apart center to center and which are a greater distance from the lower end of said annular passageway than the critical height and means for supplying hydrocarbon charge to the upper ends of said hydrocarbon inlets.

6. A process for the supply of fluid hydrocarbons and granular contact material to a compact reaction bed of contact material maintained within a confined conversion zone, which comprises: passing contact material onto the surface of said bed as a laterally confined annular stream which flows down the wall of the conversion zone as it supplies said bed; injecting fluid hydrocarbons into said stream at a plurality of points horizontally spaced apart a distance less than $$\frac{20r}{R}$$

inches center to center, where $R$=the reaction bed radius and $r$=the radius of the injection points and the level of injection in said stream being such that when plotted on Figure 8 against the stream width, it will fall above the curve on Figure 8.

7. A method for the supply of fluid hydrocarbons and granular contact material onto the surface of a compact reaction bed of contact material, which comprises: supplying contact material to the upper surface of said bed as a laterally confined annular stream which has an inside radius greater than $0.70(R-W)$ but less than $0.90(R-W)$, where R is the radius of the reaction bed and W is the width of the annular stream in consistent units; injecting fluid reactant into said stream at a plurality of points which are horizontally spaced apart a distance less than $$\frac{20r}{R}$$

inches center to center, where $R$=the reaction bed radius and $r$=the radius of the injection points, and the level of injection in said stream being such that when it is plotted on Figure 8 against the stream width, it will fall below the curve on Figure 8.

References Cited in the file of this patent

UNITED STATES PATENTS

| | | |
|---|---|---|
| 2,701,788 | Schutte | Feb. 8, 1955 |
| 2,794,771 | Evans | June 4, 1957 |
| 2,842,430 | Bishop | July 8, 1958 |
| 2,846,371 | Halik | Aug. 5, 1958 |